(12) United States Patent
Silverman et al.

(10) Patent No.: US 9,331,843 B2
(45) Date of Patent: May 3, 2016

(54) QUANTUM SYNCHRONIZATION FOR CLASSICAL DISTRIBUTED SYSTEMS

(71) Applicant: RAYTHEON COMPANY, Waltham, MA (US)

(72) Inventors: Steven J. Silverman, Fullerton, CA (US); Nils Paz, San Diego, CA (US); John R. Harmon, San Diego, CA (US)

(73) Assignee: RAYTHEON COMPANY, Waltham, MA (US)

( * ) Notice: Subject to any disclaimer, the term of this patent is extended or adjusted under 35 U.S.C. 154(b) by 283 days.

(21) Appl. No.: 13/898,763

(22) Filed: May 21, 2013

(65) Prior Publication Data

US 2014/0270802 A1 Sep. 18, 2014

Related U.S. Application Data

(60) Provisional application No. 61/792,623, filed on Mar. 15, 2013.

(51) Int. Cl.
*H04L 7/00* (2006.01)
*G06F 1/12* (2006.01)

(52) U.S. Cl.
CPC ............... *H04L 7/0075* (2013.01); *G06F 1/12* (2013.01)

(58) Field of Classification Search
CPC ............ H04L 7/0075; H04B 10/2556; H04B 10/25753; H04B 10/272; H04B 10/298; H04J 14/0242; H04J 14/0245; H04J 14/0246; G06F 1/12
See application file for complete search history.

(56) References Cited

U.S. PATENT DOCUMENTS

| | | | | | |
|---|---|---|---|---|---|
| 4,327,277 | A | * | 4/1982 | Daly | B23K 1/0056 219/121.64 |
| 5,267,305 | A | * | 11/1993 | Prohs | H04M 3/42 379/202.1 |
| 5,517,516 | A | * | 5/1996 | Marshall | H01S 3/16 372/20 |
| 7,286,444 | B1 | * | 10/2007 | Bahder | G04G 7/02 250/336.1 |
| 7,359,064 | B1 | * | 4/2008 | Bahder | G01B 11/002 356/496 |
| 7,426,156 | B1 | * | 9/2008 | Bahder | G04C 11/02 342/357.31 |
| 7,451,292 | B2 | * | 11/2008 | Routt | B82Y 10/00 257/14 |
| 2002/0041687 | A1 | * | 4/2002 | Parks | H04L 7/0075 380/263 |
| 2004/0196878 | A1 | * | 10/2004 | Arisawa | H01S 3/30 372/25 |
| 2005/0199812 | A1 | * | 9/2005 | Shih | G01S 19/23 250/338.1 |

(Continued)

OTHER PUBLICATIONS

M. Pelton et al., "Bright, single-spatial-mode source of frequency non-degenerate, polarization-entangled photon pairs using periodically poled KTP." Opt. Express, vol. 12, 3573, 2004.*

(Continued)

*Primary Examiner* — Danny Leung
(74) *Attorney, Agent, or Firm* — Lewis Roca Rothgerber Christie LLP

(57) ABSTRACT

A quantum mechanical synchronization system for a classical distributed computing system. Einstein-Podolsky-Rosen links are established providing entangled photons to provide the quantum synchronization. In one embodiment, the system includes a laser oscillator pump, a spontaneous parametric down-conversion element coupled to the laser oscillator pump, the spontaneous parametric down-conversion element having a first optical output and a second optical output, a first photodetector coupled to the first optical output, a first clock coupled to the first photodetector, a second photodetector coupled to the second optical output by an optical link, and a second clock coupled to the second photodetector.

18 Claims, 3 Drawing Sheets

(56) References Cited

U.S. PATENT DOCUMENTS

| | | | | |
|---|---|---|---|---|
| 2006/0103535 | A1* | 5/2006 | Pahlaven | G06K 7/10306 340/572.1 |
| 2006/0152719 | A1* | 7/2006 | Iuliano | G01N 21/658 356/301 |
| 2006/0249670 | A1* | 11/2006 | Monroe | G06N 99/002 250/283 |
| 2008/0201580 | A1* | 8/2008 | Savitzky | G06F 21/725 713/189 |
| 2009/0080888 | A1* | 3/2009 | Sugawara | H04L 7/0075 398/61 |
| 2009/0194702 | A1* | 8/2009 | Meyers | H04L 9/0858 250/393 |
| 2009/0286487 | A1* | 11/2009 | Rofougaran | H03B 21/01 455/73 |
| 2010/0079833 | A1* | 4/2010 | Langford | B82Y 10/00 359/107 |
| 2010/0085678 | A1* | 4/2010 | Jefferson | B82Y 10/00 361/225 |
| 2010/0177297 | A1* | 7/2010 | Guha | G01C 3/08 356/4.01 |
| 2010/0253442 | A1* | 10/2010 | Mu | H03J 3/20 333/17.1 |
| 2014/0270802 | A1* | 9/2014 | Silverman | G06F 1/12 398/141 |
| 2014/0355998 | A1* | 12/2014 | Tanzilli | H04L 9/0852 398/141 |
| 2014/0376576 | A1* | 12/2014 | Jespersen | H01S 3/06712 372/18 |

OTHER PUBLICATIONS

Written Opinion of the International Searching Authority for International Application No. PCT/US2014/012981, filed Jan. 24, 2014, Written Opinion of the International Searching Authority mailed Apr. 9, 2014 (5 pgs.).

International Search Report for International Application No. PCT/US2014/012981, filed Jan. 24, 2014, International Search Report dated Mar. 24, 2014 and mailed Apr. 9, 2014 (3 pgs.).

Atatüre et al., "Entanglement in Cascaded-Crystal Parametric Down-Conversion," The American Physical Society, 86(18):4013-4016, Apr. 30, 2011.

Hayat et al., "Two-Photon Emission from Semiconductors," Department of Electrical Engineering, Technion, Haifa 32000, Israel, pp. 1-15.

"Characterisation of a spontaneous parametric down-conversion source for spatially-entangled photon pairs," Chapter 2, pp. 7-16.

* cited by examiner

QUANTUM SYNCHRONIZATION FOR CLASSICAL DISTRIBUTED SYSTEMS

CROSS-REFERENCE TO RELATED APPLICATION(S)

This application claims the benefit of Provisional Application No. 61/792,623, filed Mar. 15, 2013, entitled "QUANTUM SYNCHRONIZATION FOR CLASSICAL DISTRIBUTED SYSTEMS", the entire content of which is incorporated herein by reference.

BACKGROUND

1. Field

One or more aspects of embodiments according to the present invention relate to synchronization of classical distributed computing systems, and more particularly to a quantum system for synchronization of classical distributed computing systems.

2. Description of Related Art

In a real-time distributed computing environment, multiple nodes coordinate their activity to achieve a set of specific results. As processors have increased in speed and diminished in size, adding more processors has become routine and a viable solution for many computationally challenging efforts. The challenge has now shifted to the coordination of all nodes. Each node may have multiple processors and each processor has its own clock. The clocks vary in precision based on the particular oscillation mechanism and the amount of heat absorbed by the oscillator. This variance cause clocks to skew at differing rates. The clock skew is closely monitored such that all nodes meet a time window. Synchronization messages are sent between nodes to try to determine an approximate clock standard. Furthermore, as the nodes are separated in space one has to regard the message's "time of flight" from node to node. Since the time of flight is based on a clock, the greater the clock precision and synchronization, the more accurate the data.

In current systems, real-time and quasi real-time systems depend on the success of meeting their service requirements depending upon the accuracy, timeliness of their responses and their resilience to faults regardless of their design or target applications. A real-time system must have a good notion of time. A time base can be absolute, corresponding to a physical or relative clock based on specific events. Typically a synchronization primitive is implemented to establish and maintain a common time base among distributed functional nodes and between computational tasks. The task then is to ensure an acceptable level of synchrony.

The problem of synchronization depends on coordinating the control flow among tasks and processors. If a system has a single program module then it is referred as a uni-processor system. One straightforward solution for a uni-processor system is to use a common time base derived from the processor's clock. In a distributed system with multiple processing nodes ascertaining the common clock is difficult. Although it is just one facet of synchronicity, it is an important one. The object is to establish and maintain consistency system wide amongst the various subsystems distributed in the real-time environment. A system can be synchronized by both processes or tasks and nodes or clocks.

As regards temporal synchrony (nodes or clocks), each node in a distributed system possesses a local clock mechanism and the nodes communicate via messages. The system architecture assumes that message passing occurs with a bounded propagation delay. Usually physical time refers to absolute time in the physical world while logical time is time produced by the clock on the node. In order to make the system useful one can map the physical time (t) the logical time (T) as T=C(t) where C(T) is an event.

The rate of time change for a logical clock when it exactly matches the physical clock is then $$\frac{dD(t)}{d(t)} = 1.$$

A typical crystal oscillator drifts by about $10^{-5}$ seconds per second. That is about 0.86 seconds in a 24 hour period. Two clocks could be separated by as much as 1.72 seconds in a 24 hour period. One can define the synchronization envelope as p and the drift of a clock is bounded by $$|((C(t_2)-C(t_1))-(t_2-t_1)| \leq p|t_2-t_1|$$

Similarly one can define the proximity of two events whereby the events are separated in space by some distance. As described, the logic of synchronization across both space and time can become quite convoluted. It engenders additional processing and increases overall entropy in the system.

SUMMARY

Embodiments of the present invention relate to the field of distributed computing systems for many applications including systems such as: radar, avionics, command and control, telecommunications, and missile launch. Applications include any system in which a large number of independent computer nodes must coordinate their logical activity to produce a particular result.

Embodiments of this invention involve synchronization of distributed systems using quantum entanglement. Quantum entanglement, or Einstein-Podolsky-Rosen (EPR) pairing, produces a physical phenomenon whereby a pair of fields or particles behaves as if they were the same field or particle across both space and time. An example of this would be if Lab A cooperates with Lab B to entangle two pairs of photons. If Lab A were to measure photon A, the results would be random fluctuations. The same would occur with Lab B. However, if the two labs were to compare these fluctuations they would find that they are either 100% correlated or 100% inversely correlated.

Using this phenomenon of entanglement as the basis of a master clock may reduce processing by approximately 20% to 30 in the overall system.

According to an embodiment of the present invention there is provided a system for synchronization, including: a laser oscillator pump; a spontaneous parametric down-conversion element coupled to the laser oscillator pump, the spontaneous parametric down-conversion element having a first optical output and a second optical output; a first photodetector coupled to the first optical output; a first clock coupled to the first photodetector; a second photodetector coupled to the second optical output by an optical link; and a second clock coupled to the second photodetector.

In one embodiment, the optical link includes: a fiber-optic transmitter coupled to the second optical output; an optical fiber coupled to the fiber-optic transmitter; and a fiber-optic receiver coupled to the optical fiber.

In one embodiment, the laser oscillator pump includes an Argon ion ($Ar^+$) laser.

In one embodiment, the laser oscillator pump includes an Krypton ion ($Kr^+$) laser.

In one embodiment, the spontaneous parametric down-conversion element includes two nonlinear crystals and a beam splitter.

In one embodiment, the laser oscillator pump includes a pulsed laser.

In one embodiment, the pulsed laser is configured to generate pulses having a width greater than 100 microseconds and less than 10 milliseconds.

In one embodiment, the spontaneous parametric down-conversion element includes a nonlinear crystal and a beam splitter.

In one embodiment, the nonlinear crystal is a beta-barium-borate crystal.

In one embodiment, the nonlinear crystal is configured for Type I phase matching.

In one embodiment, the nonlinear crystal is configured for Type II phase matching.

In one embodiment, the nonlinear crystal is configured to generate pairs of polarization entangled photons.

In one embodiment, the optical link includes: a fiber-optic transmitter coupled to the second optical output; a fiber splitter coupled to the fiber-optic transmitter; a first optical fiber coupled to the fiber splitter; and a fiber-optic receiver coupled to the optical fiber, and the system includes: a second optical fiber coupled to the fiber splitter; a second fiber-optic receiver coupled to the second optical fiber; a third photodetector; and a third clock coupled to the third photodetector.

In one embodiment, the first clock includes a low-pass filter.

In one embodiment, the first clock includes a Schmitt trigger.

In one embodiment, the first clock includes a band-pass filter.

In one embodiment, the laser oscillator pump is configured to produce more than 10 milliwatts and less than 1 watt of optical power.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system for quantum synchronization for classical distributed systems provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
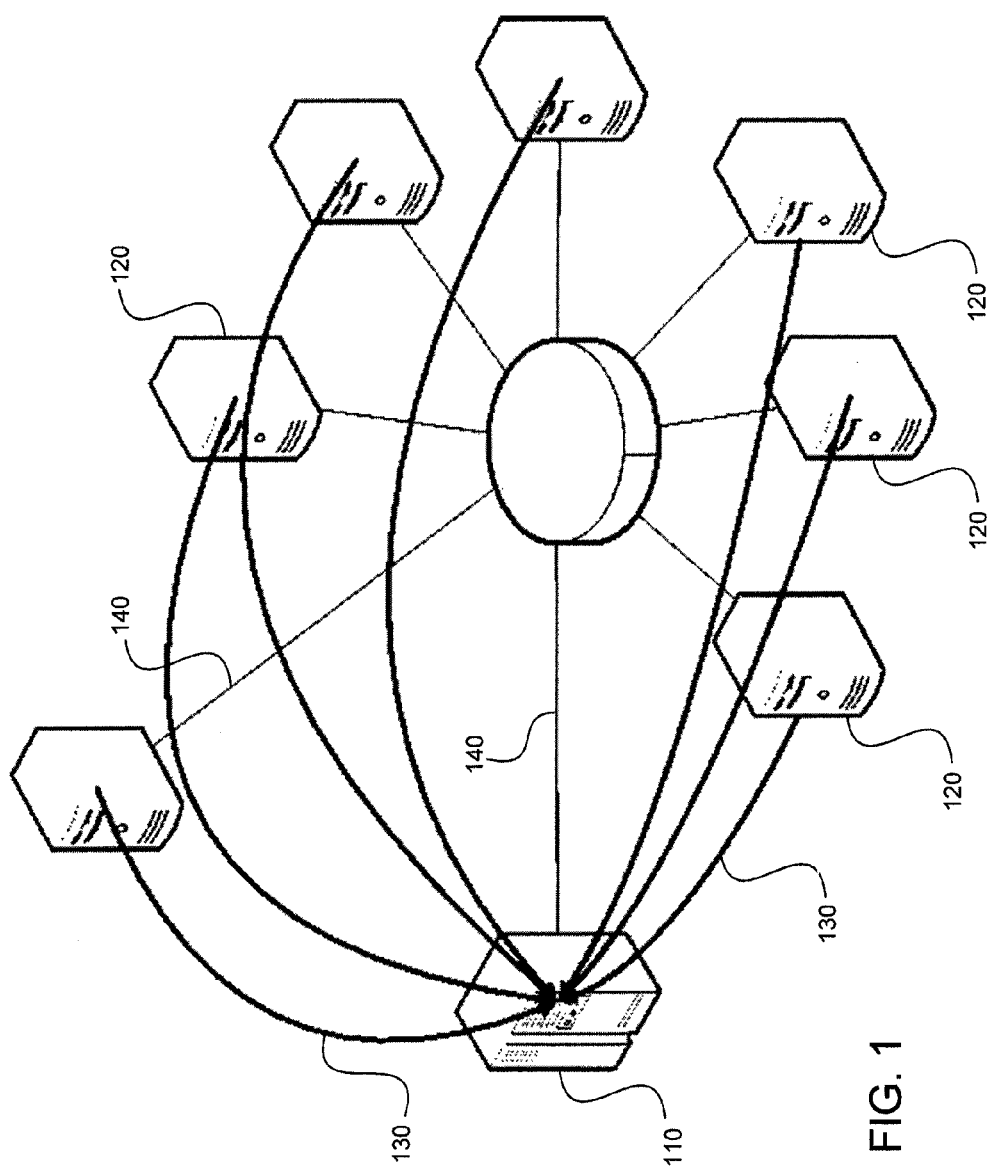
FIG. 1 is a schematic diagram of a distributed computing system employing quantum mechanical clock synchronization according to an embodiment of the present invention.

Referring to FIG. 1, in a distributed computing system, a master node 110 may interact with one or more subordinate nodes, which may be referred to as remote nodes 120, in performing tasks. If data are to be exchanged between the nodes, then synchronization may be important for adequate performance. If, for example, the output of a first node at the completion of a first sub-task is required as input to a second node for work to begin on a second sub-task, then the second sub-task cannot be started until execution of the first sub-task is complete. If the second node completes a previous sub-task before receiving input from the first node, then it may be idle until the necessary input arrives, or it may proceed without the necessary input, which may result in an error condition. If the second node is idle before beginning the second sub-task, then it may complete the second subtask late, which may cause a third node, which requires the output of the second sub-task, to be idle. Thus, synchronization errors may accumulate and propagate around a network of nodes in a distributed computing system. In the absence of synchronization errors, a distributed computing system may be composed of nodes operating in lockstep, with, for example, a first node sending the output of a first sub-task to a second node just in time for the second node to begin a second sub-task.

Existing distributed computing systems use multiple clocks and must synchronize all clocks in order to sustain efficient data passing from node to node. Existing systems try to align clock skews and clock drift by calculating time of flight, clock drift and skew and placing these within an acceptable error range such that all data and processor loads finish within an acceptable range. The problems encountered may be compounded as more processors and more load are added to the system, whereby either more hardware is required or more software is required, or both. Existing solutions focus on more clever algorithms which reduce complexity but still require multiple clocks and more software.

To the extent that clock errors contribute to imperfect synchronization, the performance of such a system may be improved using a quantum mechanical technique of clock synchronization. To benefit from such a synchronization technique, the computers in the distributed computing system need not be quantum computers; classical computers may benefit from the use of quantum mechanical clock synchronization.

In classical Newtonian physics, two objects can only communicate by sending or receiving waves or particles across both space and time. In quantum physics, entangled waves or particles share state information across space and time without sending or receiving waves or particles because the attributes of one entangled wave or particle are the same as the attributes of the other wave or particle across space and time. Embodiments of the present invention use entanglement to provide a single master quantum clock in order to synchronize all clock skews and drifts system wide. Several entangled particles may be formed if several particles interact, or are created in a single interaction, so that the particles are described by a single quantum state, and measurements made of the particles' properties are strongly correlated.

The use of a single master clock may reduce system and computational loads from 20% to 30%, depending on the applications running in the distributed system. Embodiments of the present invention include a distributed set of entangled quantum clock mechanisms interfaced to conventional processors. A common state is preset in each classical processing node. If two photons are entangled, then the vibrations of one photon are exactly the same as the vibrations of its entangled partner, potentially any distance apart.

Quantum entanglement allows a single master clock as a non-local event distributed across all nodes of the distributed system, thereby creating a true simultaneous event and system wide synchronization. By using a single master clock the system may realize several advantages. Greater computational bandwidth, from 20% to 30% more, may be achieved, due to less software managing clock synchronization. There may be a reduction in the entropy due to heat, and a reduction in cost due to less complex software maintenance and traceback debugging of software timing. Finally, end user clients may experience more reliable and quicker data access because the synchronizing infrastucture required for quantum mechanical clock synchronization is less complex and more reliable.

Advantages of embodiments of the present invention include fully synchronous activity of the various nodes, a consistent and reliable heartbeat using a simple heartbeat count, a reduction in complexity in hardware and software, i.e., decreased entropy, a reduction in cost, and increased computational bandwidth for all nodes.

In one embodiment of the present invention, quantum entangled ensembles improve the performance of distributed classical computing system. A single master clock for the entire distributed system interfaces quantum devices to classical processors in a reliable and predictable way, displaces large complex classical structures otherwise used in each node for this purpose, and simplifies the system architecture.

In one embodiment of the present invention, the total absence of clock skew and clock drift (i) reduces system entropy, i.e., heat, cost, and information, (ii) reduces complexity, i.e., software and hardware cost, and (iii) enhances reliability system-wide.

In particular, a classical distributed computing system may include a master node 110 and one or more remote nodes 120, connected by optical links. Outfitting the system with a quantum mechanical synchronization system according to an embodiment of the present invention results in the formation of one or more Einstein-Podolsky-Rosen (EPR) links 130, providing the benefits of quantum mechanical synchronization for the classical distributed computing system.

Figure 2:
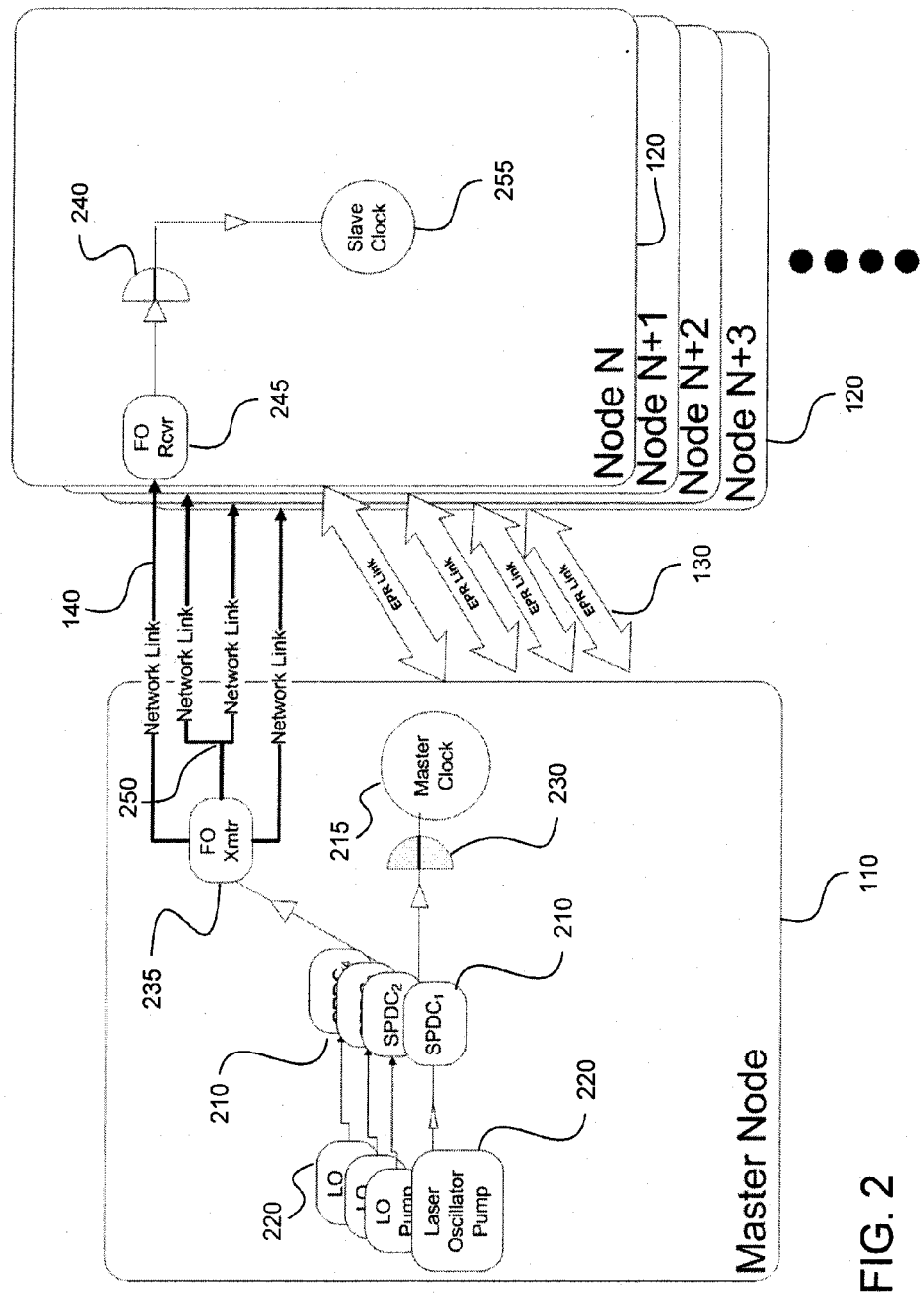
FIG. 2 is a block diagram of a quantum mechanical system for clock synchronization according to an embodiment of the present invention.
Figure 3:
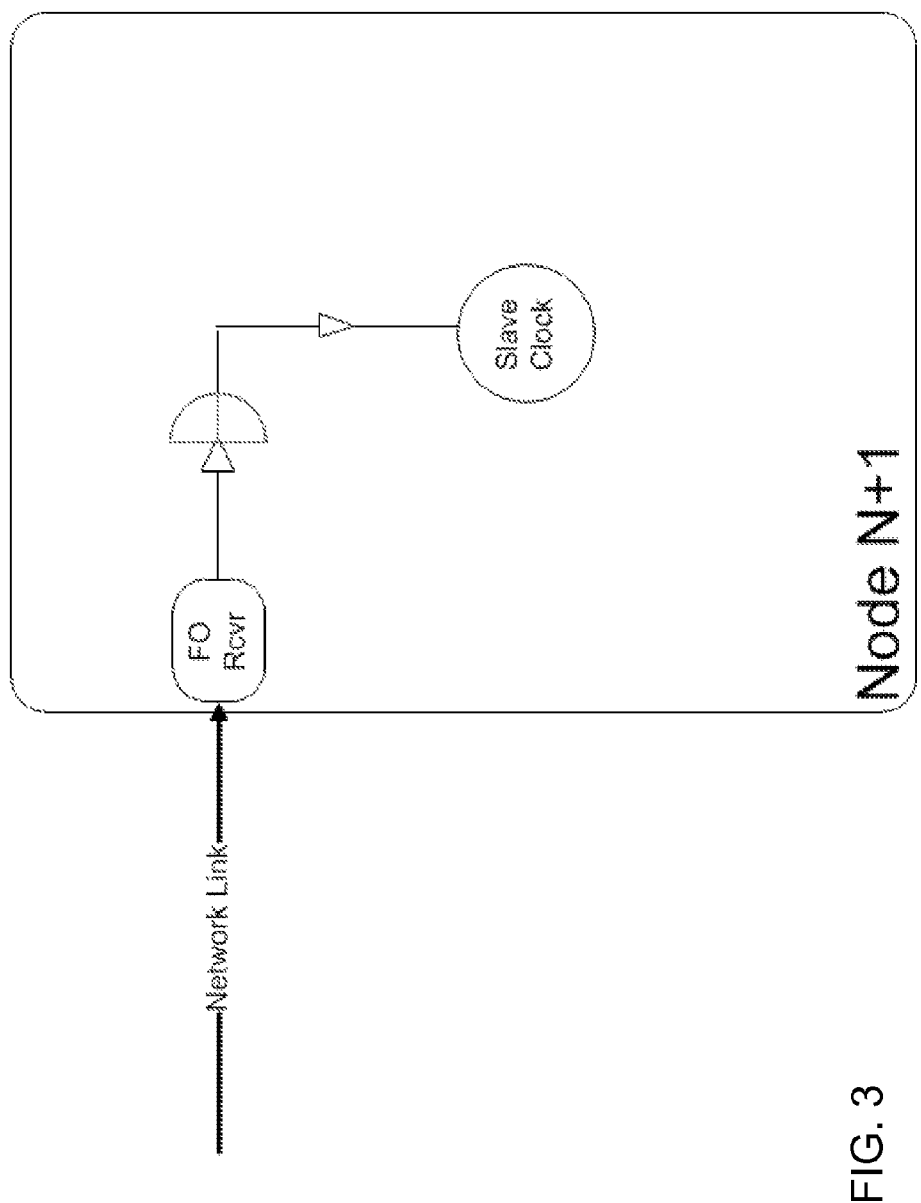
FIG. 3 is a block diagram of an N+1$^{th}$ node, according to an embodiment of the present invention.

Referring to FIG. 2, in one embodiment, a system for quantum mechanical clock synchronization may be constructed as illustrated. A laser oscillator pump, which may be referred to as a pump laser 220, generates pulses of laser light, which are used to pump a spontaneous parametric down-conversion (SPDC) crystal. In the non-linear SPDC crystal 210, the pump laser 220 light interacts with vacuum fluctuations at a lower frequency, i.e., longer wavelength, than the pump laser 220 light, to produce pairs of photons with half of the energy, i.e., with twice the wavelength, of the pump laser photons. As a result of the SPDC process, the pairs of photons are quantum mechanically entangled. The pairs of photons may be separated into individual photons by a beam splitter, and one photon of each pair may be sent to a local photodetector, i.e., a photodetector in the master node 110, and the other may be sent, over an optical link 140, to a remote node 120.

In the remote node 120, the received photons are sent to a remote node photodetector 240. In the master node 110, the output of the master node photodetector 230 is connected to a master node clock 215, the output of which then provides a synchronization signal for a classical computer connected to it in the master node 110. Similarly, in the remote node 120 the output of the remote node photodetector 240 is connected to a remote node clock 255, which may be referred to as the slave clock, the output of which then provides a synchronization signal for a classical computer connected to it in the remote node 120. The master node clock 215 and the remote node clock 255 may be signal conditioning circuits providing smooth and rapid transitions between logic states, for compatibility with clock inputs in the respective classical computers in the master node 110 and in the remote nodes 120. The master node clock 215 and the remote node clock 255 may include low-pass filters, band-pass filters, or Schmitt triggers. As a result of the quantum mechanical entanglement of the photons detected in the master node 110 and in the remote nodes 120, respectively, the synchronization of the respective clocks is unaffected by errors and imperfections affecting classical clocks, and the synchronization of the clocks is preserved even if the optical link 140 between the master node 110 and the remote node 120 is subsequently broken.

The pump laser 220 may be a pulsed laser, with a pulse repetition rate tuned to the slowest central processing unit (CPU) or mechanism in the system. It may have a pulse width of 1 ms, with shorter pulse widths providing higher power density. A Krypton ion ($Kr^+$) or Argon ion ($Ar^+$) laser may be used. The SPDC crystal 210 may be a beta-barium-borate (BBO) crystal, or a pair of such crystals may be used. Type-I or Type-II phase matching may be used, and the resulting photon pairs may be polarization entangled.

The optical link 140 may be composed of a conventional fiber-optic network link as illustrated in FIG. 2. Photons from the SPDC crystal 210 may be coupled into an optical fiber 225 at the master node 110 by master node fiber-coupling optics 235 ("FO Xmtr" in FIG. 2) and, at the remote node 120, out of the optical fiber 225 by remote node fiber-coupling optics 245 ("FO Rcvr" in FIG. 2). The photons coupled out of the fiber at the remote node 120 may then be sent to the remote node photodetector 240 as described above.

Several remote nodes 120 may be connected to a single master node clock 215, for example by installing a fiber splitter in-line after the master node fiber-coupling optics 235, to split the stream of photons into multiple streams sent to multiple remote nodes 120. The splitter may be part of the master node fiber-coupling optics 235, or a separate component, or, as illustrated in FIG. 2, there may be a splitter in the master node fiber-coupling optics 235 and an additional splitter 250 outside of the master node fiber-coupling optics 235. In another embodiment, the master node 110 may contain several master clock assemblies, each master clock assembly including a pump laser 220, an SPDC crystal 210, a beam splitter, a photodetector, a master clock, and a connection to one or more optical links 140 to remote nodes 120.

Although limited embodiments of a system for quantum synchronization for classical distributed systems have been specifically described and illustrated herein, many modifications and variations will be apparent to those skilled in the art. Accordingly, it is to be understood that the system for quantum synchronization for classical distributed systems employed according to principles of this invention may be embodied other than as specifically described herein. The invention is also defined in the following claims, and equivalents thereof.

What is claimed is:

1. A system for synchronization, comprising:
   a laser oscillator pump;
   a spontaneous parametric down-conversion element coupled to the laser oscillator pump, the spontaneous parametric down-conversion element having a first optical output and a second optical output, and being configured to produce pairs of quantum mechanically entangled photons;

a first photodetector coupled to the first optical output;
a first clock coupled to the first photodetector;
a second photodetector coupled to the second optical output by an optical link; and
a second clock coupled to the second photodetector
wherein the system is capable of:
  synchronizing the first clock and the second clock when the optical link is present; and
  preserving the synchronization of the first clock and the second clock indefinitely when the optical link is broken.

2. The system of claim 1, wherein the optical link comprises:
  a fiber-optic transmitter coupled to the second optical output;
  an optical fiber coupled to the fiber-optic transmitter; and
  a fiber-optic receiver coupled to the optical fiber.

3. The system of claim 1, wherein the laser oscillator pump comprises an Argon ion ($Ar^+$) laser.

4. The system of claim 1, wherein the laser oscillator pump comprises an Krypton ion ($Kr^+$) laser.

5. The system of claim 1, wherein the spontaneous parametric down-conversion element comprises two nonlinear crystals and a beam splitter.

6. The system of claim 1, wherein the laser oscillator pump comprises a pulsed laser.

7. The system of claim 6, wherein the pulsed laser is configured to generate pulses having a width greater than 100 microseconds and less than 10 milliseconds.

8. The system of claim 1, wherein the spontaneous parametric down-conversion element comprises a nonlinear crystal and a beam splitter.

9. The system of claim 8, wherein the nonlinear crystal is a beta-barium-borate crystal.

10. The system of claim 8, wherein the nonlinear crystal is configured for Type I phase matching.

11. The system of claim 8, wherein the nonlinear crystal is configured for Type II phase matching.

12. The system of claim 11, wherein the nonlinear crystal is configured to generate pairs of polarization entangled photons.

13. The system of claim 1,
  wherein the optical link comprises:
    a fiber-optic transmitter coupled to the second optical output;
    a fiber splitter coupled to the fiber-optic transmitter;
    a first optical fiber coupled to the fiber splitter; and
    a fiber-optic receiver coupled to the optical fiber; and
  wherein the system comprises:
    a second optical fiber coupled to the fiber splitter;
    a second fiber-optic receiver coupled to the second optical fiber;
    a third photodetector; and
    a third clock coupled to the third photodetector.

14. The system of claim 1, wherein the first clock comprises a low-pass filter.

15. The system of claim 1, wherein the first clock comprises a Schmitt trigger.

16. The system of claim 1, wherein the first clock comprises a band-pass filter.

17. The system of claim 1, wherein the laser oscillator pump is configured to produce more than 10 milliwatts and less than 1 watt of optical power.

18. A method for synchronization, the method comprising:
  operating a synchronization system to synchronize a first clock and a second clock, the operating of the synchronization system comprising:
    generating pulses of laser light with a laser oscillator pump;
    pumping, with the laser oscillator pump, a spontaneous parametric down-conversion element coupled to the laser oscillator pump, the spontaneous parametric down-conversion element having a first optical output and a second optical output;
    producing a plurality of pairs of quantum mechanically entangled photons with the spontaneous parametric down-conversion element;
    sending one photon of each of the plurality of pairs of quantum mechanically entangled photons to a first photodetector coupled to the first optical output and to the first clock;
    sending another photon of each of the plurality of pairs of quantum mechanically entangled photons to a second photodetector coupled to the second clock, and coupled to the second optical output by an optical link; and
    synchronizing the first clock and the second clock using the quantum mechanically entangled photons;
  disconnecting the optical link; and
  preserving the synchronization of the first clock and the second clock indefinitely.

\* \* \* \* \*